United States Patent [19]
Ross

[11] Patent Number: 5,799,195
[45] Date of Patent: Aug. 25, 1998

[54] STRUCTURE AND METHOD FOR DETECTING OCCURRENCE OF EXTERNAL EVENTS USING SEMAPHORES

[75] Inventor: S. Timothy Ross, Georgetown, Tex.

[73] Assignee: Dell USA, L.P., Round Rock, Tex.

[21] Appl. No.: 901,821

[22] Filed: Jul. 28, 1997

Related U.S. Application Data

[63] Continuation of Ser. No. 506,288, Jul. 24, 1995, abandoned.

[51] Int. Cl.$^6$ .................................................. G06F 15/16
[52] U.S. Cl. ........................ 395/739; 395/800; 395/825; 395/726
[58] Field of Search .................................. 395/739, 800, 395/825, 726, 309, 725, 728

[56] References Cited

U.S. PATENT DOCUMENTS

| | | |
|---|---|---|
| 4,965,718 | 10/1990 | George et al. . |
| 5,050,072 | 9/1991 | Earnshaw et al. . |
| 5,261,106 | 11/1993 | Lentz et al. . |
| 5,394,551 | 2/1995 | Holt et al. . |
| 5,428,799 | 6/1995 | Woods et al. . |
| 5,440,752 | 8/1995 | Lentz et al. . |
| 5,511,179 | 4/1996 | Chai-I . |
| 5,548,780 | 8/1996 | Krein . |

OTHER PUBLICATIONS

Intel, "Pentium™ Processor User's Manual", vol. 3: Architecture and Programming Manual, pp. 17–1 through 17–9, 1993.

James L. Peterson and Abraham Silberschatz, Operating System Concepts, Chapter 9, Concurrent Processes, ©1983, pp. 287–347.

*Primary Examiner*—Jack B. Harvey
*Assistant Examiner*—Rupal D. Dharia
*Attorney, Agent, or Firm*—Skjerven, Morrill, MacPherson, Franklin & Friel, L.L.P.; Stephen A. Terrile

[57] ABSTRACT

In a cached computer environment, an additional mechanism for communicating to a processor the occurrence of an external hardware event is provided through semaphores in the main memory. In one embodiment, the processor is provided a set of semaphore registers for storing semaphore addresses allocated in the memory. When an external device modifies a semaphore in the main memory, the cache snooping mechanism which ensures cache coherency snoops the caches to see if other copies of the modified semaphore exist in any of the caches. When the processor checks for a semaphore address in the internal cache, the processor also compares the semaphore address with the addresses contained in the semaphore registers. Upon detection of a modified semaphore in one of the semaphore registers, the processor executes a reserved interrupt service routine which invokes a pre-registered call-back procedure in the peripheral's device driver to service the event.

29 Claims, 4 Drawing Sheets

STRUCTURE AND METHOD FOR DETECTING OCCURRENCE OF EXTERNAL EVENTS USING SEMAPHORES

This application is a continuation of application Ser. No. 08/506,288, filed Jul. 24, 1995, now abandoned.

BACKGROUND OF THE INVENTION

1. Field of the invention

The present invention relates to computer systems, and more particularly to external event driven communication mechanisms which are used in computer systems such as personal computer systems.

2. Discussion of the Related Art

Personal computer systems in general and IBM compatible personal computer systems in particular have attained widespread use for providing computer power to many segments of today's modern society. A personal computer system can usually be defined as a desk top, floor standing, or portable microcomputer that includes a system unit (also referred to as a host system) having a system processor and associated volatile and nonvolatile memory, one or more diskette drives, and a fixed disk storage device; the computer system also includes a display, a keyboard, and a mouse coupled to the system unit. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

In a computer system, an external device typically communicates the occurrence of an external event to a central processing unit (CPU), also referred to as a processor, by an interrupt mechanism. Such external events include, for example, completion of a specified direct memory access (DMA) transfer. The interrupt mechanism asserts an interrupt signal on a dedicated interrupt line. Typically, the asserted interrupt signal is received into a programmable interrupt controller. The interrupt controller receives multiple interrupt signals from various peripheral devices, prioritizes the interrupt signals received, and releases the interrupts to the processor one at a time, according to priority.

The interrupt mechanism of the prior art, however, has become less than satisfactory in personal computer systems, particularly the IBM compatible personal computer systems. This is because, under the IBM compatible personal computer architecture, the number of hardware interrupt levels are limited and, typically, a large number of device drivers directly access the programmable interrupt controller. In IBM compatible personal computer systems in which the number of hardware interrupt levels is limited, interrupt controllers may be cascaded to increase the number of peripheral devices serviceable by the CPU. However, further expansion of the prior art interrupt mechanism would result in incompatibility with existing hardware and software.

SUMMARY OF THE INVENTION

The present invention relates to providing a computer with a semaphore scheme, thus advantageously allowing external devices to signal occurrence of external events and to request service from the CPU without increasing the number of interrupt levels or providing more sophisticated programmable interrupt controllers. Such a system also allows the signaling occurrence of external events to interrupt faster than via a more traditional interrupt mechanism.

More specifically, in a preferred embodiment, the invention relates to a method for detecting the occurrence of a peripheral event in a computer system having a processor, a memory coupled to the processor, and a semaphore register accessible by the processor, the peripheral being coupled to the processor and the memory. The method includes the steps of initializing the semaphore register to hold a predetermined address, causing the peripheral device to modify an address thereby causing a snoop operation of the address, determining whether the predetermined address stored in the semaphore register matches the modified address; and executing a semaphore service routine upon a match of the semaphore address.

Additionally, in another preferred embodiment, the invention relates to a method for detecting the occurrence of a peripheral event in a computer system having a processor, a memory coupled to the processor, and a plurality of semaphore registers accessible by the processor, the peripheral being coupled to the processor and the memory. The method includes the steps of initializing the plurality of semaphore registers to hold a corresponding plurality of predetermined addresses, causing the peripheral device to modify an address thereby causing a snoop operation of the address, determining whether any of the plurality of predetermined addresses stored in the plurality of semaphore registers matches the modified address; and executing a semaphore service routine upon a match of the semaphore address.

Additionally, in another embodiment, the invention relates to a system for detecting the occurrence of a peripheral event caused by a peripheral. The system includes a processor, a memory coupled to the processor, a semaphore register accessible by the processor. The peripheral accesses the processor and the memory. The system also includes means for initializing the semaphore register to hold a predetermined address, means for causing the peripheral device to modify an address thereby causing a snoop operation of the address, means for determining whether the predetermined address stored in the semaphore register matches the modified address, and means for executing a semaphore service routine upon a match of the semaphore address.

DETAILED DESCRIPTION

The present invention provides a mechanism whereby an external device can communicate occurrence of an external event without the use of a dedicated interrupt signal into the microprocessor. The present invention is illustrated herein below by a computer system having two levels of cache memory, although the computer system could have any number of levels of cache memory, including only one level.

Figure 1:
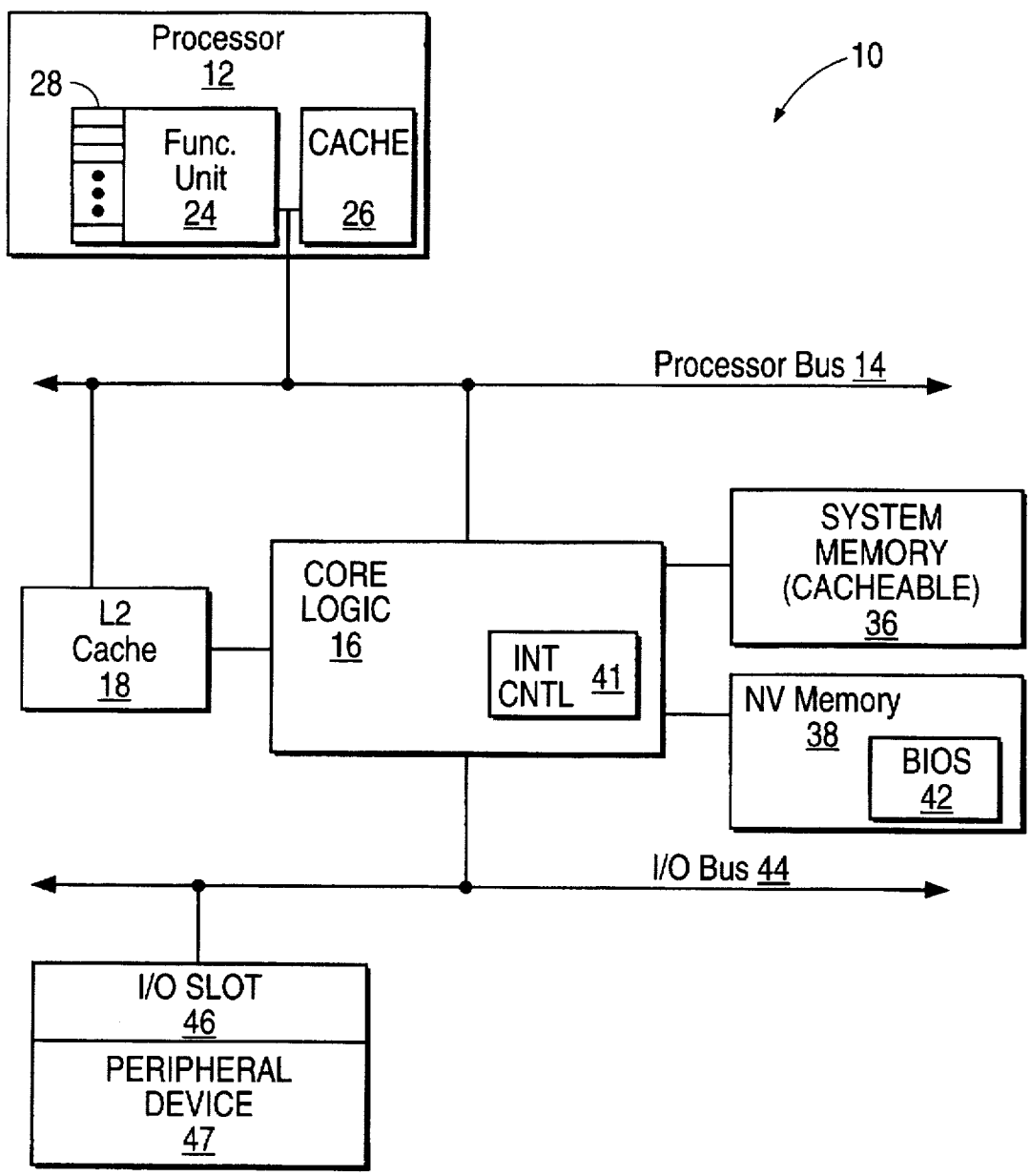
FIG. 1 shows a block diagram of a computer system in accordance with the present invention.

Referring to FIG. 1, computer system 10, having a semaphore communication system in accordance with the present invention is shown. Computer system 10 includes processor 12, coupled to processor bus 14 which, in turn, is coupled to core logic 16, as well as second level cache 18. Processor 12 may be a microprocessor which substantially conforms to the family of x86 processors, such as a Pentium microprocessor available from Intel Corporation, Santa Clara, Calif. Processor 12 includes a modification to the x86 processor family for the present invention's semaphore communication system, as explained below.

Processor bus 14 includes conventional data, address and control lines conforming to, for example, the Pentium host bus architecture.

Processor 12 includes functional unit 24, on-chip cache 26, which is a first level cache, and semaphore register set 28. Functional unit 24 and first level cache 26 are coupled to processor bus 14. Semaphore register set 28 is coupled to functional unit 24.

Computer system 10 also includes system memory 36, which is read/write memory and is cacheable. Core logic 16 is also coupled to I/O bus 44 to which a plurality of I/O slots 46 are coupled. Peripheral devices, e.g., peripheral device 47, may be coupled to each I/O slot 46. I/O bus 44 conforms to the industry standard architecture (ISA) standard, which is also sometimes referred to as the AT bus standard.

Core logic 16 performs a plurality of functions. The first function that core logic 16 performs is as a memory controller for accessing main system memory 36. Main system memory 36 is a dynamic random access memory (RAM) which may include one or more single, in-line memory modules (SIMMS) and stores programs and data for execution by system processor 12. Nonvolatile memory 38 is, e.g., a read only memory (ROM) which stores microcode including the Basic Input Output System (BIOS) 42 of computer system 10.

BIOS 42 is a microcode software interface between an operating system or application programs and the hardware of system 10. The operating system and application programs access BIOS 42 rather than directly manipulating I/O ports and control words of the specific hardware. BIOS 42 is accessed through an interface of software interrupts and contains a plurality of entry points corresponding to the different interrupts. In operation, BIOS 42 is loaded from ROM 38 to system memory 36 and is executed from system memory 36.

As part of the memory controller function, core logic 16 performs a "snooping" function to ensure cache coherency. The snooping function is performed because any memory data which is stored in system memory 36 can be accessed and modified by a peripheral device, such as peripheral device 47, while earlier copies of such memory data is cached in either first level cache 26 or both first level cache 26 and second level cache 18. When a cached copy of the memory data which is modified is detected, core logic 16 invalidates the cached copy by setting, in the cache where the cached copy is found, an "invalid" or dirty bit associated with the cached copy of the memory data.

The second function that core logic 16 performs is as an interface between processor bus 14 and I/O bus 44. As part of the interface function, core logic 16 provides an interrupt function. With the interrupt function, each peripheral device requiring service asserts a dedicated interrupt line which is routed to core logic 16 via I/O bus 44. Core logic 16 is coupled to receive an interrupt signal from each peripheral device 47 in computer system 10. If more than one peripheral device requires service at any given time, core logic 16 determines which of the peripheral devices requesting service has the highest relative priority and provides to processor 12 an interrupt vector corresponding to the entry point of an interrupt service routine of such peripheral device so that the processor can begin processing the interrupt by branching to an interrupt service routine.

Figure 2:
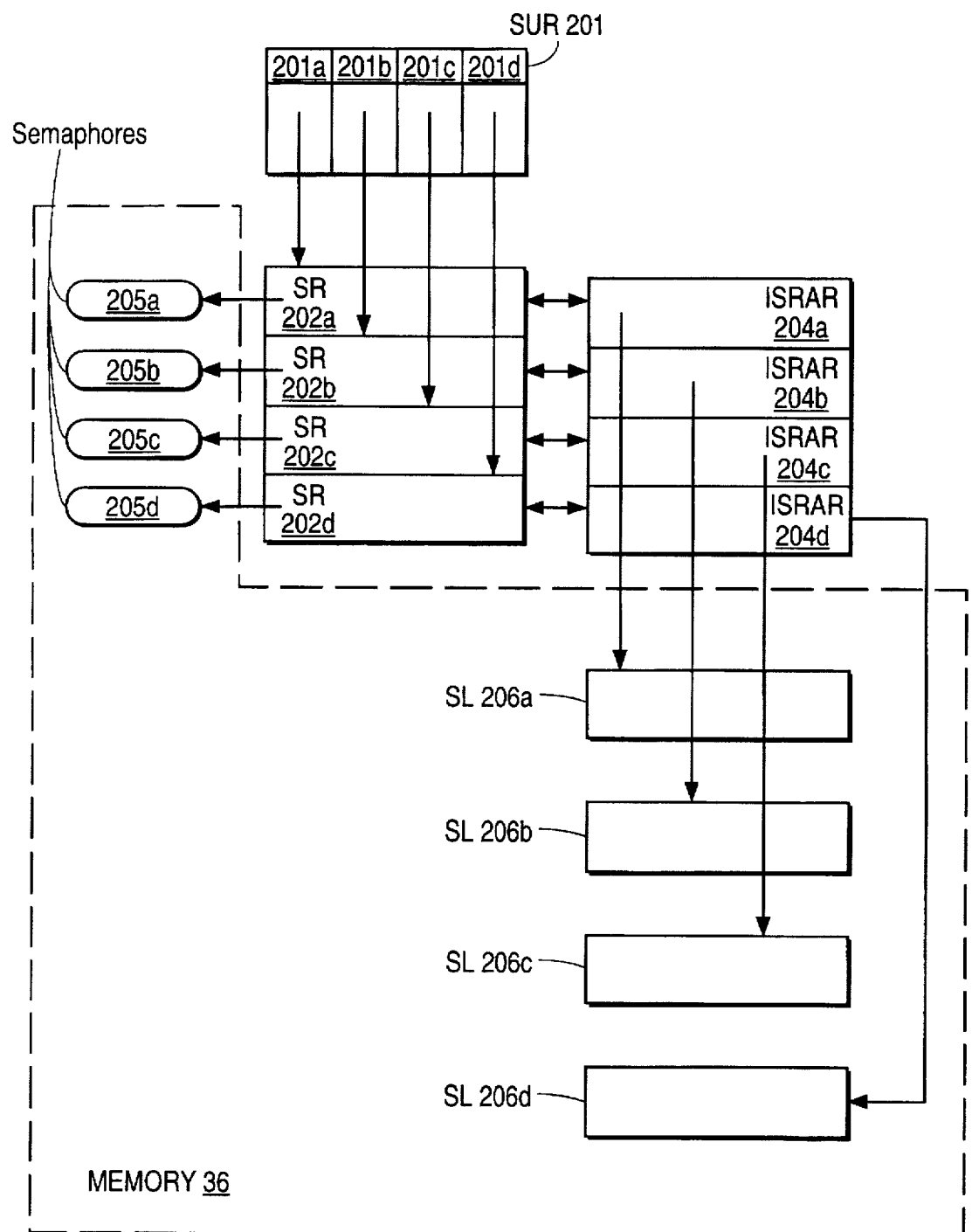
FIG. 2 shows diagrammatically a semaphore register set of the computer system of FIG. 1.

FIG. 2 shows schematically semaphore register set 28. Semaphore register set 28 includes a semaphore use register (SUR) 201a–201d, semaphore registers (SRS) 202a–202d, and interrupt service routine address registers (ISRARS) 204a–204d. While four semaphore registers and four semaphore call-back registers are shown, any number of semaphore registers and interrupt service routine address registers can be used. Each bit in semaphore use register 201 corresponds to a semaphore register and an interrupt service routine address register. A set bit in semaphore use register 201 indicates that the corresponding semaphore register is assigned to a peripheral device.

Figure 3:
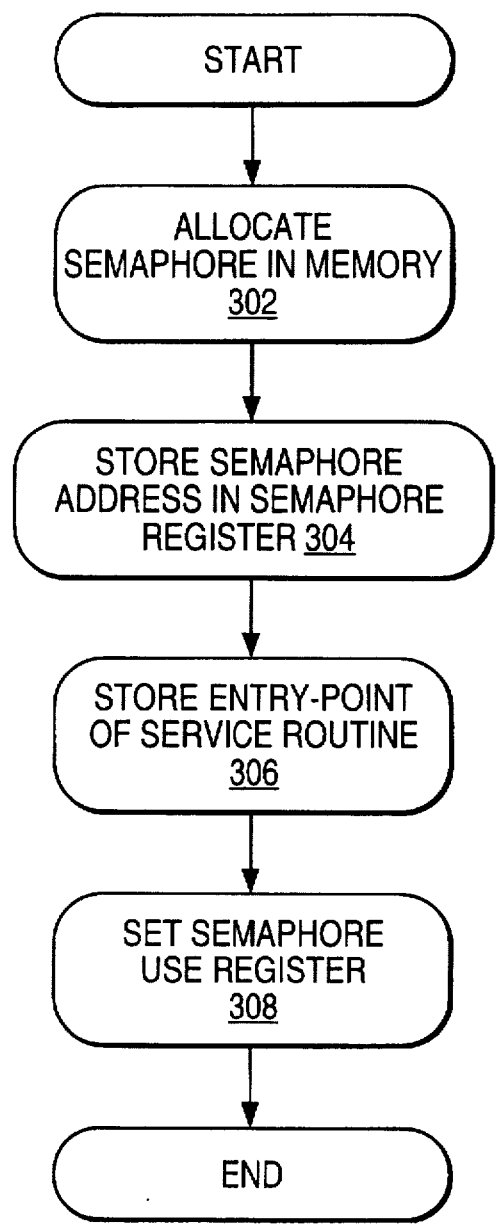
FIG. 3 shows a flow chart of the initialization of a computer using the semaphore register set of FIG. 2.

Referring to FIGS. 2 and 3, when the device driver of a peripheral device, such as peripheral 47, is installed, the device driver allocates a semaphore in main memory 36 at allocate step 302. To allocate a semaphore, such as semaphore 205a, the device driver allocates a storage location (SL), such as SL 206a, in main memory 36 and provides the address of the allocated location in the corresponding semaphore register 202a at semaphore register step 304. At the same time, the address of the entry point to the service routine in the peripheral device driver for responding to a service request by peripheral device 47 is stored ("registered") in the corresponding interrupt service routine address register 204a at entry point step 306. Additionally, the device driver sets the corresponding semaphore use register bit at semaphore use step 308.

Figure 4:
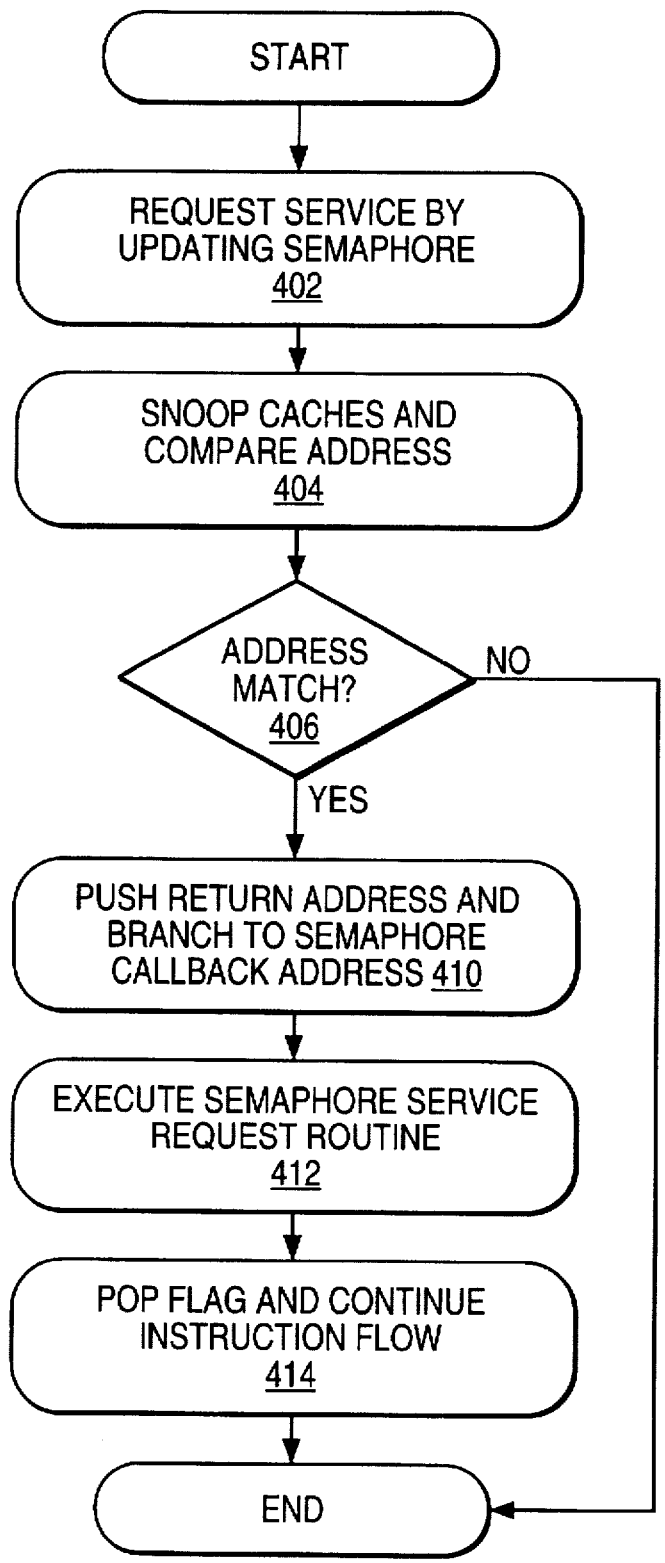
FIG. 4 shows a flow chart of the operation of a computer system using the semaphore register set of FIG. 2.

Referring to FIGS. 2 and 4, when a peripheral device 47 requires service from processor 12, the peripheral device 47 modifies semaphore 205a, via either a bus master access or a DMA memory access. Accordingly, the peripheral device requests service, at service step 402, by updating the semaphore that the device driver allocated during initialization. By updating the semaphore in main memory 36, a snooping function is forced by peripheral access to system memory 36. The snooping function snoops the caches and compares the address of the semaphore to the addresses which are stored in the semaphore registers at snoop step 404. The snoop function occurs each time there is an alternate master access to main memory. During the snoop operation, if processor 12 matches the address of semaphore 205a with the addresses of semaphore registers 202a–202d as determined during address match step 406, control transitions to service step 410 during which processor 12 branches to the service routine which is pointed to by the corresponding interrupt service routine address register 204a. Control then transfers to execute step 412 during which processor 12 executes the semaphore service request routine until a semaphore return (SRET) instruction is encountered. When a semaphore return instruction is encountered, control transitions to return step 414 during which microprocessor 12 pops the processor flag and return address off of the processor stack (similar to how an IRET (interrupt return) instruction is processed) and continues execution of the instruction following the instruction that was executed prior to the semaphore interruption.

Thus, the present invention provides an interrupt-like mechanism for servicing peripheral devices without dedicated interrupt levels, dedicated interrupt signal lines, or dedicated programmable interrupt controllers. The number of semaphore based interrupts is based upon the number of semaphore addresses which are stored within the processor.

Accordingly, providing the processor with more semaphore addresses allows the system to provide more semaphore based interrupts.

OTHER EMBODIMENTS

The detailed description above is provided to illustrate the specific embodiments of the present invention and is not intended to be limiting. Numerous variations and modifications are possible within the scope of the present invention.

For example, while the preferred embodiment discloses a semaphore use register, the semaphore use registers may be avoided by having the semaphore address registers contain a unique value prior to being initialized with a semaphore address, thus indicating their use or lack thereof based upon whether the unique value is present.

Also for example, computer system 10 may be included as part of an embedded system. In an embedded system there may be a single interrupting device. If a single interrupting device is used, then computer system 10 does not require an interrupt controller, the interrupt can be connected directly to the processor.

Also for example, the present invention is applicable not only to the x86 family of microprocessors, but also any microprocessor having a semaphore facility and an internal processor cache as described.

Also for example, while the preferred embodiment is described with reference to an I/O bus conforming to the ISA bus standard, it is contemplated that any bus architecture such as the peripheral connect interface (PCI) bus architecture, the Microchannel architecture (MCA), the Extended Industry Standard (EISA) bus architecture, the NuBus bus architecture or the UniBus bus architecture may be used.

Also for example, while the preferred embodiment shows the semaphore address registers located within processor 12, it is anticipated that these registers could be located in a location which is accessible by the processor. For example, the semaphore address registers could be accessible via an predetermined semaphore interrupt address or via a semaphore table having an address which is accessible by the processor, the semaphore table pointing to the semaphore address registers. Also for example, the semaphore address registers could be configured using a single standard interrupt vector standard interrupt vectors such as those used to service any other type of interrupts. In this case, the system would include semaphore flags to indicate which peripheral device caused the generation of the semaphore interrupt and thus interrupted the processor operation.

Also, for example, the semaphore routine address could be located at a fixed memory location (e.g., in main memory) similar to a standard interrupt table. The processor would then only require the semaphore address register when detecting the occurrence of an event and accessing a semaphore routine.

The present invention is defined by the appended claims.

I claim:

1. In a computer system having a processor, a memory coupled to the processor, and a peripheral device coupled to the memory, the processor including a cache, a semaphore register, and snoop circuitry for the cache and the semaphore register, a method for detecting the occurrence of a peripheral event, the method comprising:

causing a peripheral device driver to allocate a semaphore address in the memory, initializing the semaphore register to hold the semaphore address, causing the peripheral device to write to an address thereby causing a snoop operation of the address by the snoop circuitry, determining whether the semaphore address stored in the semaphore register matches the address written by the peripheral device, and executing a semaphore service routine upon a match of the semaphore address and the address written by the peripheral device, the semaphore service routine being determined by the peripheral device driver.

2. The method of claim 1 further comprising providing a semaphore service routine address register for storing an entry point address to the semaphore service routine, and accessing the semaphore service routine address register to determine the entry point address of the semaphore service routine to be executed.

3. The method of claim 1 further comprising providing a semaphore use register, and setting the semaphore use register to a first value when the semaphore register is initialized to hold the semaphore address.

4. The method of claim 1 further comprising continuing execution of an instruction flow when a semaphore return instruction is encountered during executing the semaphore service routine.

5. In a computer system having a processor, a memory coupled to the processor, and a peripheral device coupled to the memory, the processor including a cache, a plurality of semaphore registers, and snoop circuitry for the cache and the semaphore registers, a method for detecting the occurrence of a peripheral event, the method comprising:

allocating a semaphore address in the memory, initializing the plurality of semaphore registers to hold a corresponding plurality of semaphore addresses, causing the peripheral device to write to an address thereby causing a snoop operation of the address by the snoop circuitry, determining whether any of the plurality of semaphore addresses stored in the plurality of semaphore registers matches the address written by the peripheral device, and executing a semaphore service routine upon a match of the semaphore address, the semaphore service routine being determined by the peripheral device driver.

6. The method of claim 5 further comprising initializing a plurality of semaphore service routine registers to hold a corresponding plurality of semaphore service routine entry point addresses, the plurality of semaphore service routine registers corresponding to the plurality of semaphore registers, and accessing a respective semaphore service routine register to determine the entry point address of the semaphore service routine to be executed upon the match of the corresponding semaphore address in the corresponding semaphore register.

7. The method of claim 5 further comprising providing a plurality of semaphore use registers corresponding to the plurality of semaphore addresses;

setting a respective semaphore use register to a first value when a corresponding semaphore register is initialized to hold a semaphore address;

wherein the determining whether any of the plurality of semaphore addresses stored in the plurality of semaphore registers matches the modified address includes comparing the modified address with each semaphore address having a corresponding semaphore use register set to the first value.

8. The method of claim 5 further comprising continuing execution of an instruction flow when a semaphore return instruction is encountered during the executing a semaphore service routine step.

9. A system for detecting the occurrence of a peripheral event caused by a peripheral device, the system comprising:

a processor, the processor including
a cache,
semaphore register, and
snoop circuitry coupled to the cache and the semaphore register, the snoop circuitry including a cache snoop circuit and a semaphore register snoop circuit, a memory coupled to the processor, the peripheral device coupled to the memory, means for causing a peripheral device driver to allocate a semaphore address in the memory, means for initializing the semaphore register to hold the semaphore address, means for causing the peripheral device to write to an address thereby causing a snoop operation of the address by the snoop circuitry, means for determining whether the semaphore address stored in the semaphore register matches the address written by the peripheral device, and means for executing a semaphore service routine upon a match of the semaphore address, the semaphore service routine being determined by the peripheral device driver.

10. The system of claim 9 further comprising means for providing semaphore service routine address, and means for accessing the semaphore service routine address to determine the address of the semaphore service routine to be executed.

11. The system of claim 9 further comprising a semaphore use register, and means for setting the semaphore use register to a first value when the semaphore register is initialized to hold the semaphore address.

12. The system of claim 9 further comprising means for continuing execution of an instruction flow when a semaphore return instruction is encountered.

13. The system of claim 9 wherein the semaphore register is located within the processor.

14. An apparatus for detecting the occurrence of a peripheral event, the apparatus comprising a semaphore register set, the semaphore register set including a plurality of semaphore registers, each of the semaphore registers for storing an address of a corresponding semaphore;

a semaphore use register for storing a plurality of bits, each of the bits corresponding to one of the semaphore registers, each of the bits indicative of whether a corresponding semaphore register is assigned to a peripheral device; and a plurality of semaphore service routine address registers, each of the semaphore service routine address registers corresponding to one of the semaphore registers, each of the semaphore service routine address registers for storing an address of an entry point to a service routine in a peripheral device driver for responding to a service request by a corresponding peripheral device.

15. The apparatus of claim 14 further comprising:

a processor, the processor including
a cache;
the semaphore register set; and
snoop circuitry coupled to the cache and the semaphore register set, the snoop circuitry including a cache snoop circuit and a semaphore register set snoop circuit, a memory coupled to the processor, the memory including first and second pluralities of address locations, each of the first address locations for storing a semaphore, each of the second address locations for storing an entry point to a service routine.

16. The apparatus of claim 15 wherein the memory is coupled to receive an update to at least one of the semaphores from a peripheral device;

the processor includes snoop logic for performing a snoop of the semaphore register set responsive to a snoop notice from the memory which is responsive to the peripheral device updating a semaphore, the snoop logic determining if an address corresponding to the updated semaphore matches an address stored in the semaphore registers; the processor accessing an address stored in a semaphore service routine address register to initiate a service routine corresponding to the peripheral device, the semaphore service routine address register accessed by the processor corresponding to the updated semaphore, the processor accessing the address stored in the semaphore service routine address register responsive to the snoop logic determining a match of the address corresponding to the updated semaphore and an address stored in the semaphore registers.

17. The apparatus of claim 16 further comprising a peripheral device coupled to the memory, the peripheral device for updating a semaphore corresponding to the peripheral device.

18. The apparatus of claim 16 further comprising a cache, the snoop logic performing a snoop of the cache responsive to a memory address being updated.

19. The apparatus of claim 16 wherein the processor includes x86-compatible architecture.

20. The apparatus of claim 16 wherein the update to the at least one of the semaphores from the peripheral device comprises writing a first value to one of the first address locations already storing the first value.

21. The apparatus of claim 14 wherein the peripheral event is an event external to the apparatus.

22. A method for interrupting a processor, the method comprising:

writing to a memory address by a peripheral device;

snooping a semaphore address register for a match to the memory address; and interrupting processor execution upon a match of an address in the semaphore address register and the memory address, the interrupting processor execution including providing a semaphore address corresponding to an entry point of a semaphore service routine.

23. The method of claim 22 further comprising:

branching by the processor from a point of an instruction flow to the entry point of the semaphore service routine; and returning by the processor to the point in the instruction flow from the semaphore service routine upon termination of the semaphore service routine.

24. The method of claim 22 further comprising:

allocating the memory address for storing a semaphore by a peripheral device driver before writing the memory address; and storing the memory address to the semaphore address register after allocating the memory address for storing the semaphore and before writing the memory address.

25. The method of claim 24 further comprising:

setting a semaphore use register to a first value indicating that a corresponding semaphore register is assigned to a peripheral device before writing the memory address.

26. The method of claim 1 wherein the peripheral event is an event external to the computer system.

27. The method of claim 3 wherein the processor comprises:

the semaphore use register; and a semaphore service routine register for storing an address of an entry point to the semaphore service routine.

28. The method of claim 5 wherein the peripheral event is an event external to the computer system.

29. The method of claim 7 wherein the processor comprises:

the semaphore use registers; and a plurality of semaphore service routine registers for storing addresses of entry points to corresponding semaphore service routines, each semaphore register having a corresponding semaphore use register and a corresponding semaphore service routine register.

* * * * *